Dec. 4, 1934.  R. B. BENJAMIN  1,982,781
SHOCK ABSORBING SOCKET
Filed May 19, 1930  2 Sheets-Sheet 1
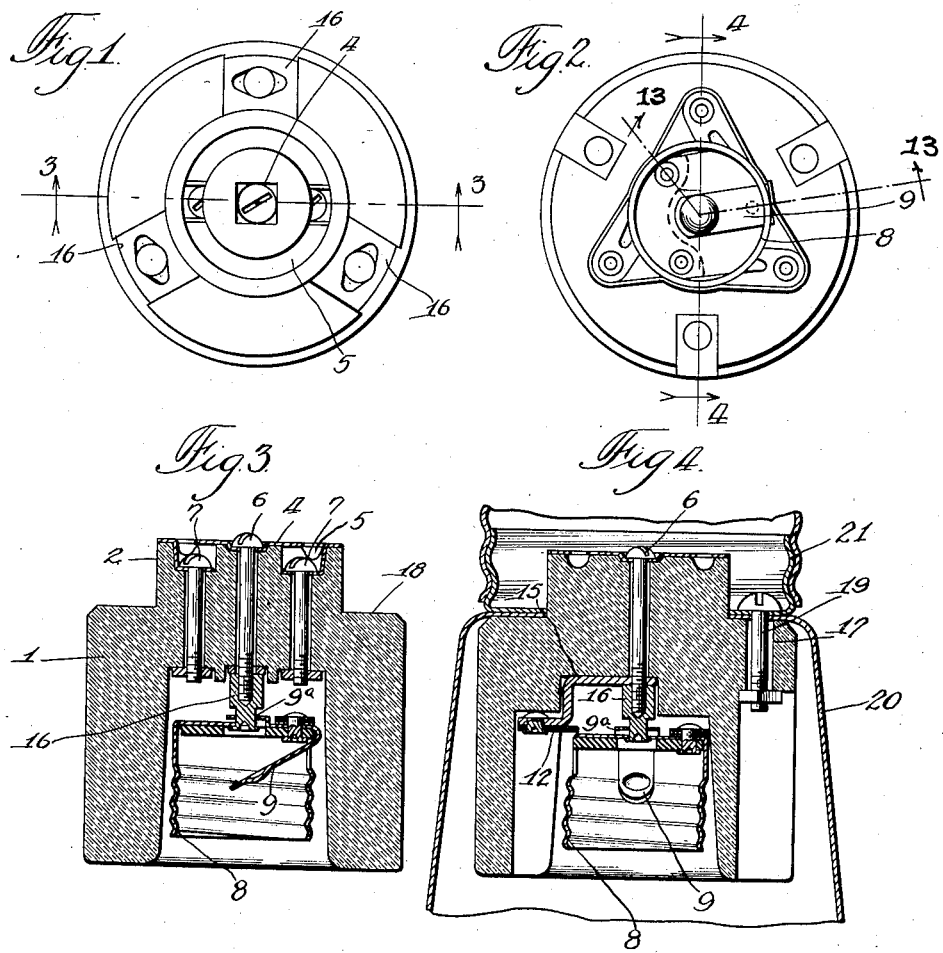
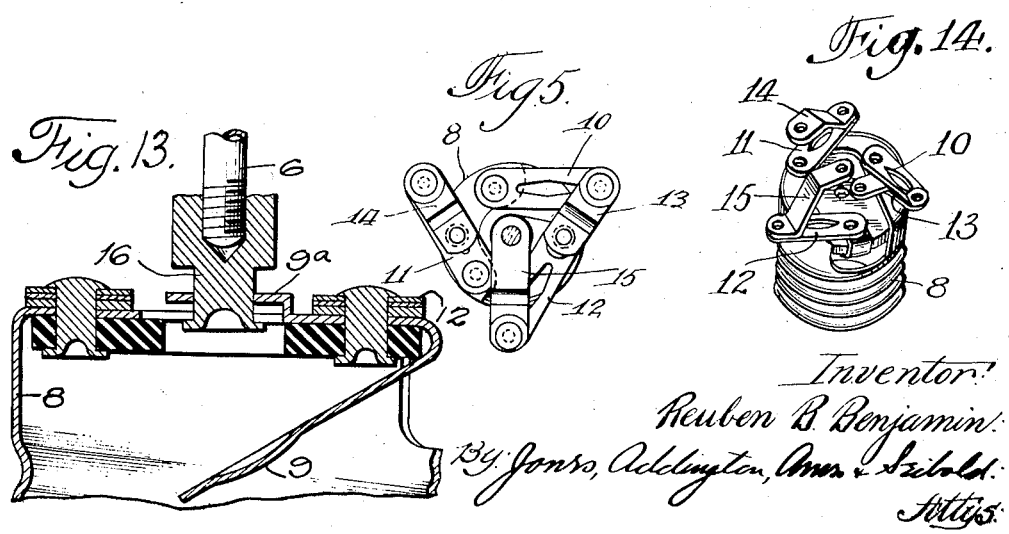
Inventor:
Reuben B. Benjamin Dec. 4, 1934.    R. B. BENJAMIN    1,982,781
SHOCK ABSORBING SOCKET
Filed May 19, 1930    2 Sheets-Sheet 2
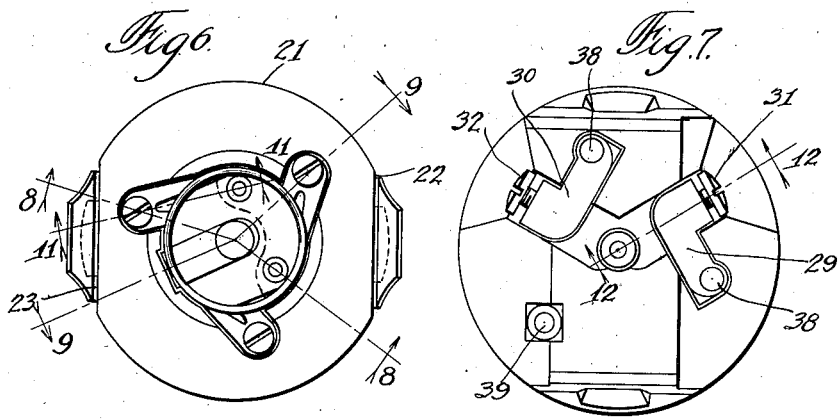
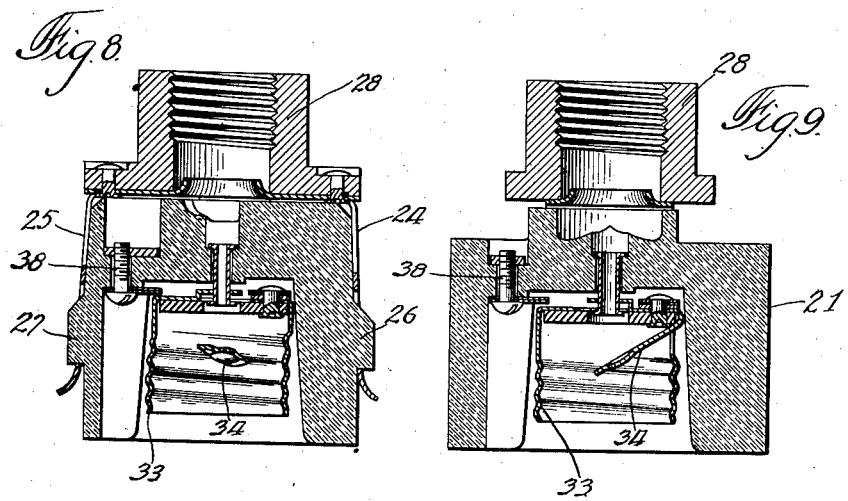
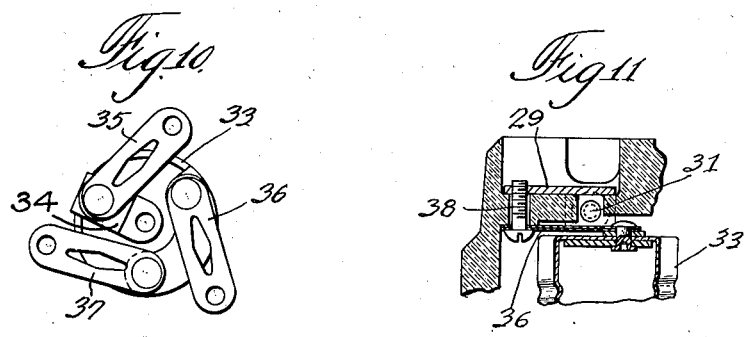
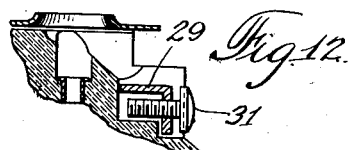

Patented Dec. 4, 1934

1,982,781

UNITED STATES PATENT OFFICE 1,982,781

SHOCK ABSORBING SOCKET

Reuben B. Benjamin, Chicago, Ill., assignor to Benjamin Electric Mfg. Co., Des Plaines, Ill., a corporation of Illinois Application May 19, 1930, Serial No. 453,471

3 Claims. (Cl. 173—358)

This invention relates to shock absorbing sockets.

One of the objects of this invention is to provide an improved shock absorbing socket construction which will be easy to assemble and wire, efficient and durable.

Another object of this invention is to provide a shock absorbing socket of the type above referred to in which axial movement of the lamp receptacle is limited without affecting the resiliency of the socket.

Further objects and advantages will be apparent from the following description when taken together with the accompanying drawings, in which latter:

Figure 1 is a top plan view of a shock absorbing socket embodying the present invention;

Fig. 2 is a bottom plan view of the socket shown in Figure 1;

Fig. 3 is a central vertical cross sectional view taken on the line 3—3 of Figure 1;

Fig. 4 is a vertical cross sectional view taken on the line 4—4 of Fig. 2;

Fig. 5 is a top plan view of the spring construction for resiliently supporting a lamp holder within the socket and electrically connecting contacts therein;

Fig. 6 is a bottom view of a modified form of shock absorbing socket;

Fig. 7 is a top plan view of the socket shown in Fig. 6;

Fig. 8 is a vertical sectional view taken on the line 8—8 of Fig. 6;

Fig. 9 is a vertical sectional view taken on the line 9—9 of Fig. 6;

Fig. 10 is a top plan view of the lamp receptacle and spring members for supporting and electrically connecting the same within the socket used in the construction shown in Fig. 6;

Fig. 11 is a cross sectional view taken on the line 11—11 of Fig. 6;

Fig. 12 is a cross sectional view taken on the line 12—12 of Fig. 7;

Fig. 13 is a section on the line 13—13 of Fig. 2; and

Fig. 14 is a perspective view of the parts shown in Fig. 5.

Referring more particularly to the drawings, the construction shown comprises an insulating cup-like base 1 having a reduced portion 2. Ring contacts or terminals 4 and 5 are positioned on the back of the insulating base, the ring 4 being held in place by a screw 6 and the ring 5 by screws 7, all of which screws extend through the back of the insulating base and into the cup-like base through holes provided therefor in the backing portion. It is evident that any other type of contact or terminal may be used in place of the ring contacts shown.

A lamp receptacle and the means for resiliently supporting and electrically connecting the same to the rest of the socket comprises a shell contact 8 having a center contact 9, which shell and center contacts are adapted to engage the lamp base contacts of a lamp to be inserted in the shell. Attached to the top of the lamp receptacle, as by means of riveting or the like, are leaf-spring members 10, 11 and 12, made of any suitable conducting material. The leaf-spring members 10 and 11 are fastened to the shell 8 and the leaf-spring member 12 is fastened to the upper portion of the center contact 9. Secured to the free ends of the leaf-spring members 10, 11 and 12 by any desirable means, such as riveting, are Z-shaped arms 13, 14 and 15. Each of the arms 13, 14 and 15, as shown in Figs. 4 and 5, has a portion which lies on top of the leaf-spring members adjacent the means securing the two together and then is bent upwardly at right angles, after which the free end is again bent so as to lie parallel to the end secured to the springs. The lamp receptacle and resilient supporting means are inserted in the cup-like base with the screw 6 threading into the upper free end of the arm 15 and the screws 7 threading into the upper free ends of the arms 13 and 14. When the wires are connected to the terminals, the center contact receives current from the ring terminal 4 through the screw 6, the arm 15 and the leaf-spring member 12, and the side or shell contact receives current through the ring terminal 5, the screws 7, the arms 13 and 14 and the springs 10 and 11.

In order to limit axial movement of the lamp receptacle when inserting or withdrawing a lamp therefrom, an abutment member 16 is threaded onto the lower or inner end of the screw 6 and extends downwardly into the top of the lamp receptacle. An extension 9a of the center contact 9, preferably formed integrally therewith, engages the abutment member 16, the portion 9a being provided with an opening through which the abutment member extends. Holes 17 are provided in the base 1, which holes, as shown in Fig. 4, extend inwardly from the shoulder portion 18 formed by the reduced portion 2. Screws 19 are extended through these openings 17 so as to hold a reflector supporting member 20 in position about the socket. Also, as shown in Fig. 4, a screw threaded annular connector 21 may be held by the screws 19 so that the whole socket and reflector may be screwed into a threaded support adapted to receive the annular connector 21.

In the modified form shown in Figs. 6 to 12, the cup-like base 21 is formed with opposite sides 22 and 23 flat so as to engage the arms 24 and 25 of a spring clip supporting member. Projections 26 and 27 are provided on the flat portions 22 and 23 for the purpose of holding the socket in place within the spring clip supporting member. The spring-clip supporting member is riveted to a bushing 28 which is adapted to be screwed into an outlet box or the like. Terminal plates 29 and 30 with the terminal screws 31 and 32 are provided on the back of the insulating base.

Referring to Figs. 10, 11 and 12, the lamp receptacle and resilient means for supporting the same, comprises a shell contact 33 and a center contact 34. Attached to the center contact 34 is a leaf-spring member 35 and attached to the shell contact 33 are the leaf-spring members 36 and 37, which spring members are made of any suitable conducting material. Here again riveting is preferably employed as the securing means. The lamp receptacle is supported within the cup-like base by means of screws 38 which extend up through the free end of the leaf-spring members 35 and 36 through openings provided therefor in the rear of the base and are threaded into the terminal plates 29 and 30. The leaf-spring member 37 is secured to the rear of the base by means of a screw similar to the screw 39 of Fig. 7.

With this construction lead wires are attached to the terminal screws 31 and 32. The current is then carried to the center contact by means of the terminal plate 30, one of the screws 38 and the leaf-spring member 35, and the current is carried to the shell contact by means of the terminal plate 29, the other of the screws 38 and the leaf-spring member 36.

By means of the spring clip supporting member, the whole socket may be easily removed from the rest of the fixture and as the terminals and terminal screws are accessible from the sides of the socket, it is a very simple matter to change or substitute any socket by this means.

While but a single embodiment of this invention is herein shown and described, it is to be understood that various modifications thereof may be apparent to those skilled in the art without departing from the spirit and scope of this invention and, therefore, the same is to be limited only by the scope of the appended claims and the prior art.

I claim:

1. A shock absorbing socket construction comprising an insulating base, a lamp holder and contact construction yieldingly supported on said base, comprising shell and center contacts for engaging the lamp base contacts, a plurality of conductor members on the back of the insulating base, means for yieldingly supporting said lamp holder comprising a plurality of leaf-spring members on said base, said spring members each being electrically connected at one end to one of said lamp holder contacts, and at the other to supporting arms, and securing means extending through the back of said insulating base for securing said supporting arms to said base and electrically connecting them with said conductor members respectively.

2. A shock absorbing socket construction comprising a resiliently supported lamp holder having shell and center contacts, said shell contact having an inwardly extending flange at its upper end, and means for resiliently supporting said lamp holder and supplying current to said contacts comprising a plurality of supporting leaf springs of sheet metal, one spring having one end electrically connected with the center contact and another spring having one end electrically connected with the shell contact, supporting means and means for securing the other ends of said springs to said supporting means at points spaced about the axis of the shell contact and lying outside a cylindrical surface containing the shell contact whereby they are readily accessible for the securing operation.

3. A shock absorbing socket construction comprising a resiliently supported lamp holder having shell and center contacts, said shell contact having an inwardly extending flange at its upper end, means for resiliently supporting said lamp holder and supplying current to said contacts comprising a plurality of supporting leaf springs of sheet metal, one spring having one end electrically connected with the center contact and another spring having one end electrically connected with the shell contact, supporting means and means for securing the other ends of said springs to said supporting means at points spaced about the axis of the shell contact and lying outside a cylindrical surface containing the shell contact whereby they are readily accessible for the securing operation, said supporting means comprising an insulating base underneath which said holder is supported, electrical terminals on the upper side of said base, and said securing means comprising conducting means extending through said insulating base for electrically connecting the electrical terminals with the leaf springs and supporting the leaf springs underneath the insulating base.

REUBEN B. BENJAMIN.